United States Patent [19]

Smialowicz et al.

[11] Patent Number: 5,102,070
[45] Date of Patent: Apr. 7, 1992

[54] INFLATABLE AIRCRAFT EVACUATION SLIDE ARRANGEMENT

[75] Inventors: Edward Smialowicz, Pt. Pleasant; George Kopilak, Wickatunk, both of N.J.

[73] Assignee: Air Cruisers Company, Belmar, N.J.

[21] Appl. No.: 714,632

[22] Filed: Jun. 13, 1991

[51] Int. Cl.⁵ .............................. B64D 25/14
[52] U.S. Cl. .................. 244/137.2; 244/905; 244/107; 182/48; 193/25 B
[58] Field of Search .......... 244/137.2, 905, 107; 182/48; 193/25 B

[56] References Cited

U.S. PATENT DOCUMENTS

| | | | |
|---|---|---|---|
| 1,787,976 | 1/1931 | Evensen | 244/107 |
| 1,818,597 | 8/1931 | Adams et al. | 244/107 |
| 2,131,528 | 9/1938 | Soyer | 244/107 |
| 3,454,245 | 7/1969 | Burkdoll et al. | 244/905 |
| 3,458,009 | 7/1969 | Favors | 244/137.2 |
| 3,598,215 | 8/1971 | Summer | 244/905 |
| 3,669,217 | 6/1972 | Fisher | 244/905 |
| 4,013,247 | 3/1977 | Giffin | 244/137.2 |
| 4,717,096 | 1/1988 | Labarre et al. | 244/905 |
| 4,723,628 | 2/1988 | Fisher | 244/905 |

Primary Examiner—Galen Barefoot
Attorney, Agent, or Firm—Anthony F. Cuoco

[57] ABSTRACT

An arrangement which permits installation of an inflatable aircraft evacuation slide in an enclosure disposed in a non-pressurized cavity beneath an aircraft exit. The enclosure is opened when activated by the gas used to inflate the slide and the arrangement provides a more rigid and positive attachment of the inflated slide to the aircraft than has heretofore been the case.

6 Claims, 3 Drawing Sheets

INFLATABLE AIRCRAFT EVACUATION SLIDE ARRANGEMENT

BACKGROUND OF THE INVENTION

This invention relates to an inflatable evacuation slide arrangement of the type now installed on virtually all passenger carrying aircraft for providing means for rapid evacuation from the aircraft in the event of an emergency.

These arrangements include inflatable evacuation slides normally folded in an uninflated condition into a pack requiring a minimum of space in the interior of an aircraft exit door or immediately adjacent thereto. With the aircraft door closed, a girt extending from the inflatable evacuation slide is connected to the floor inside the aircraft doorway such that, in the event of an emergency, it is only necessary to open the aircraft door to automatically deploy the slide. When the door is open, the girt pulls the slide from its container thereby allowing the slide to fall through the now open doorway. Subsequently, the evacuation slide is rapidly inflated via an inflation source connected to the slide or aircraft door and is then ready for the evacuation of passengers within a very short period of time following the opening of the door. In this regard, reference is made to U.S. Pat. No. 4,526,262 issued to Bruce Malcolm on Jul. 2, 1985 (U.S. Cl. 193/25B) and to U.S. Pat. No. 4,684,079 issued to Ralph A. Miller, et al on Aug. 4, 1987 (U.S. Cl. 244/137.2).

The prior art evacuation slide arrangements as described above, being mounted to or near the aircraft door, require otherwise usable space within the aircraft passenger cabin. Also, with the prior art arrangements, the door structure has to be substantial enough to support the weight of the evacuation slide structure. Further, attachment of the particular arrangement to the aircraft exit door sill as required by the prior art results in a less rigid and less positive attachment than is optimum.

The present invention is advantageous over the prior art in that it provides an inflatable aircraft emergency evacuation slide arrangement which permits installation of the evacuation slide in an enclosure beneath an aircraft exit door within the aircraft fuselage outside of the passenger cabin. A further advantage is realized in that the enclosure for the evacuation slide opens automatically upon activation of a gas supply used to inflate the evacuation slide.

Accordingly, the present invention saves usable space within the aircraft passenger cabin; requires a less substantial exit door structure than has heretofore been the case; and provides a more rigid and positive attachment of the evacuation slide to the aircraft as is desireable.

SUMMARY OF THE INVENTION

This invention contemplates an inflatable aircraft emergency evacuation slide arrangement which is configured to fit within a cavity beneath an aircraft door, within the aircraft fuselage outside of the passenger cabin. An evacuation slide enclosure fits within the cavity and includes a frame. A door for the enclosure fits flush into the frame and forms a portion of the aircraft fuselage. A seal is maintained between the door and the frame to prevent water, de-icing fluids, or other contaminants from entering the enclosure.

The enclosure door pivots about the lower edge of the frame. The arrangement is such that after a predetermined pivoting angle during an opening sequence, the door separates from the enclosure and is carried away by an inflating slide to which it is tethered so as not to adversely effect the slide function.

Prior to deployment of the slide, the door is retained in the frame by a locking system featuring gas operated retaining locks. The locking system uses the gas which inflates the slide for operation of the retaining locks. The arrangement is such that when a remote gas source is triggered to inflate the slide, as by opening the aircraft door, the gas first reaches the locking system for operating the locks to unfasten the door from the frame and thereafter the gas reaches the slide for inflating same.

A more rigid and positive attachment of the inflatable slide to the aircraft than has heretofore been possible is achieved via a plurality of and the utilization of an inflatable stabilizer tube which distends below the aircraft cabin floor and locks the inflatable slide in position.

DETAILED DESCRIPTION OF THE INVENTION

Figure 1:
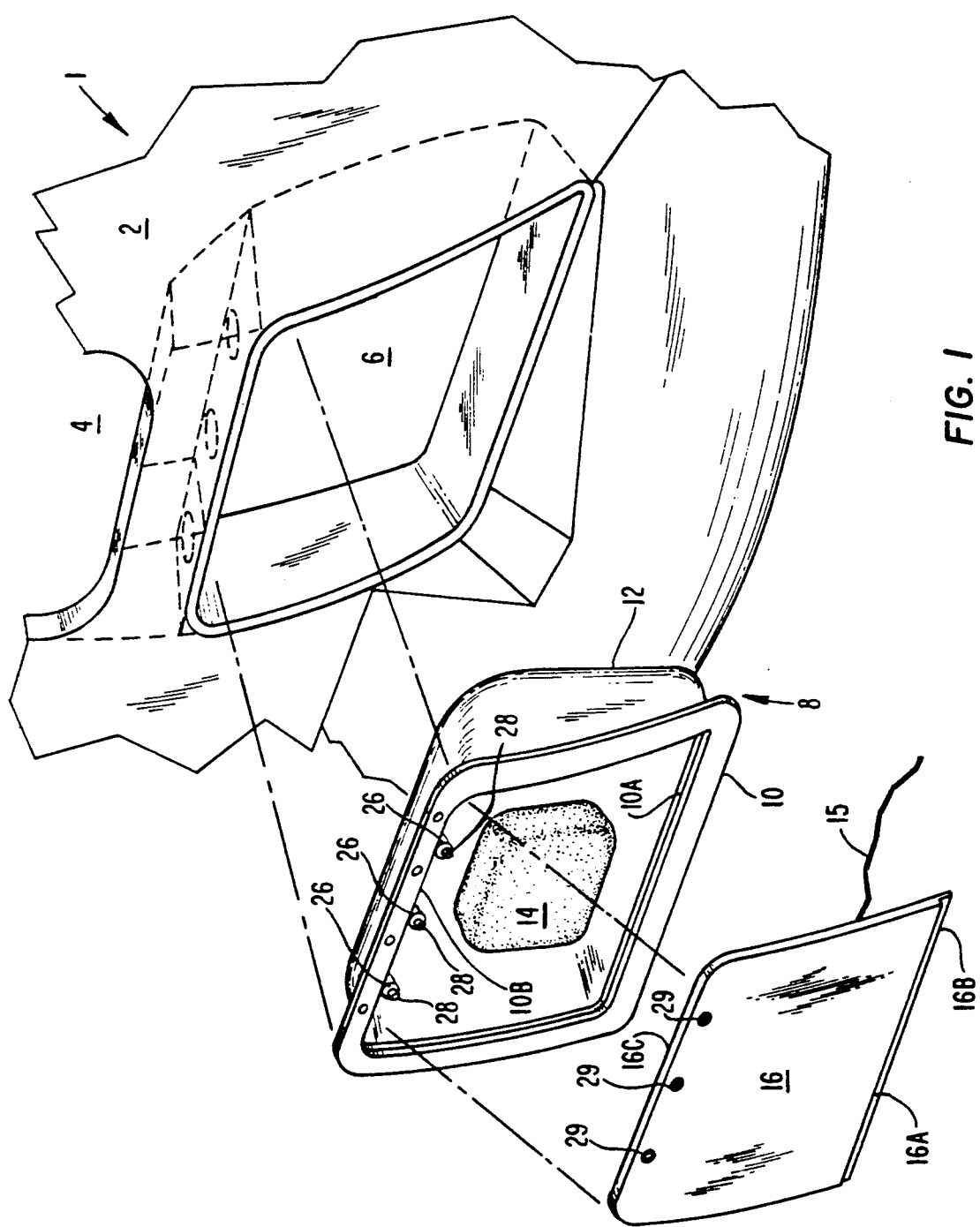
FIG. 1 is an exploded view generally showing the invention.

With reference to FIG. 1, the fuselage of an aircraft 1 is designated by the numeral 2. An aircraft exit door 4 and a non-pressurized cavity 6 below door 4 open to the exterior of fuselage 2. An enclosure designated generally by the numeral 8 fits within cavity 6.

Enclosure 8 includes a frame 10 which may be of aluminum or the like attached to a container 12 of a suitable lightweight composite fabric-like material which, in combination with aluminum door frame 10 provides a desired strength and rigidity.

In this regard, it will be understood that during deployment of a folded slide pack 14 disposed within container 12 and deployment of the slide pack from enclosure 8 to provide an inflated evacuation slide as will be hereinafter more fully explained, the enclosure may be subjected to an internal pressure of ten psig as a result of folded, inflated slide pack 14 becoming distended. After deployment, enclosure 8 must provide attachment provisions for the inflated slide with sufficient strength to hold the inflated slide and to resist wind forces acting against the slide, as well as to withstand loads consequent to evacuee egress.

Figure 2:
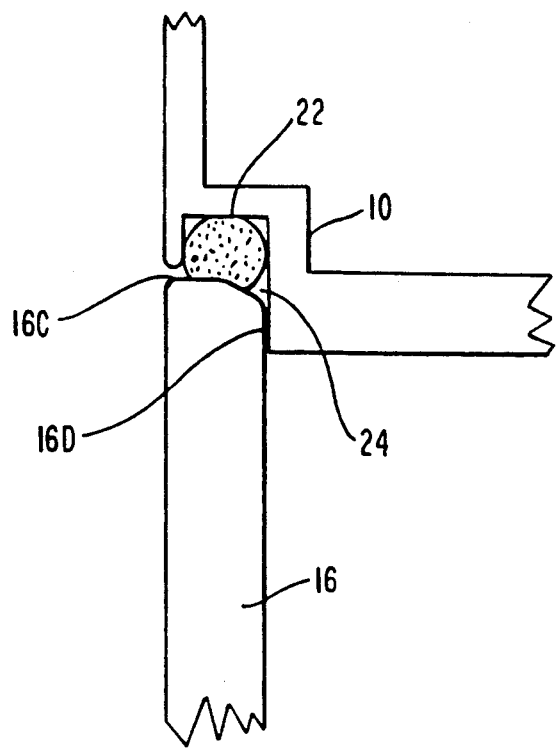
FIG. 2 is a diagrammatic representation showing an enclosure upper edge and a door sealing arrangement therefor.

A door for enclosure 8 is designated by the numeral 16. Door 16 fits flush into enclosure frame 10 and forms a part of aircraft fuselage 2. In regard to door 16, it will be understood that the door must withstand up to ten psig internal pressure as it disengages from enclosure 8 during slide deployment. A seal is maintained between the door and the frame to prevent water such as from rain, de-icing fluid, or other contaminants, from entering the enclosure. It will be realized that the door must function, i.e. separate from the enclosure, in spite of ice build up or the like. The sealing arrangement for the door is illustrated in FIGS. 2 and 3 and will be hereinafter described.

Door 16 is fabricated as an aluminum extrusion perimeter frame around a composite surface capable of providing the strength and rigid form required. The composite surface is a suitable lightweight composite material such as the material used for container 12. Alternatively, the entire door can be fabricated using a composite material.

Door 16 is supported within frame 10 at its lower edge 16A via a projection 16B which fits behind a lip 10A in the corresponding lower edge of frame 10 along the entire length of the lower door edge, whereby the door is pivotable away from the frame.

Figure 3:
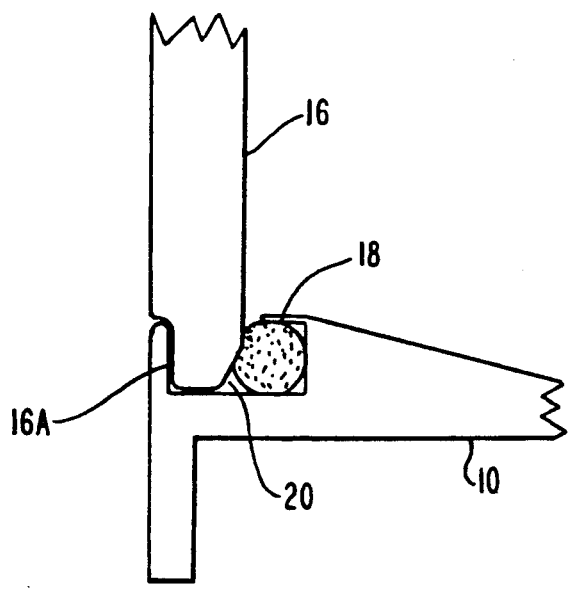
FIG. 3 is a diagrammatic representation showing an enclosure lower edge and a door sealing arrangement therefor.

With reference to FIG. 3, a suitable seal 18 is disposed in a channel 20 just inboard of lower door edge 16A. After pivoting a predetermined angle during the door opening sequence, the door separates and is carried away by inflating slide pack 14 to which the door is tethered as by a suitable tethering line 15 (FIG. 1) in a position where it will not adversely affect the inflated slide function. In this regard, it will be understood that ice formed in the crevices when the door is installed does not inhibit door opening, since the crevices become wider during opening and ice, if any, cannot wedge the door, as is desireable.

A similar seal arrangement is shown in FIG. 2 wherein the upper edge of frame 10 is illustrated. A seal 22 fits into a channel 24 just above upper edge 16C of door 16. A like seal arrangement seals the sides of door 16 to the sides of frame 10, as will now be understood.

With continued reference to FIGS. 2 and 3, seals 18 and 22 are fabricated from closed cell silicone foam. Door 16 closes and seals against a flange 16D (FIG. 2) on the frame at its top and both sides as aforenoted. A radial force system provides sealing forces. This eliminates the need for high structural strength of door 16 as would be the case if the sealing were conventional as by gasketing, and of the type wherein the gasket is compressed between the inner door surface and a flange fixed to the perimeter of the opening. With the seals shown in FIGS. 2 and 3, the door position on closing is not influenced and therefore, the door will always be flush in the closed position against a positive stop. With the door arrangement as described above, it is possible to minimize the door thickness and thereby allow maximum volume for slide pack 14 as will be recognized as desireable.

It will be appreciated that a reliable door retaining system is required which will maintain door 16 closed during extensive service. The retaining system must withstand forces consequent to a ten psig pressure differential applied to the door inner surface. The retaining system must not protrude outside or inside the skin surface of fuselage 2. Further, the retaining system must activate and release the door at or before the instant of slide inflation activation. In the event of failure of an inflation activating arrangement, the retaining system must open the door at a defined force applied by distending inflatable slide pack 14 within enclosure 8. For servicing, the retaining system must permit door opening from outside the aircraft, but no projections such as handles or the like are permitted.

The door retaining system used in the present invention to satisfy the above requirements uses the gas which inflates slide pack 14 as an activating medium to activate door retaining locks 26, three of which are shown in FIG. 1 disposed along the upper edge 10B of enclosure frame 10.

Door retaining locks 26 are of the pneumatic lock-/socket pin type such as shown in drawings No. D39025 and 60878, Air Cruisers Co., Assignee of the present invention, said drawings being incorporated herein by reference. The lock pins operate in a manner similar to detent pins commonly used to retain various aircraft access panels. The locks basically feature a shaft within a sleeve. At the end of the sleeve, four locking balls project beyond the outside diameter of the sleeve and this projection of the locking balls beyond the sleeve "captures" door 16.

Door 16 is released when high pressure gas (500 psig) is delivered from a slide inflation gas reservoir at the start of a slide inflation cycle to locks 26. The inner shaft of each lock is displaced by the gas and the balls drop into a groove in the shaft to become flush with the sleeve. This allows cover 16 to freely open, i.e. pivot about lower edge 10A of frame 10.

Within each lock is an operating pin designated by the numeral 28 in FIG. 1. This pin is accessible from the outside of the aircraft via holes 29 in door 16 to permit opening of the door by pushing on the pin as may be required. Since no protuberances are permitted, flat head screws mounted on the face of the door at each lock provide an attach point which, when backed out a few turns depresses the pin while pulling on the screw to permit manual release of the door. No special tools are required.

Figure 5:
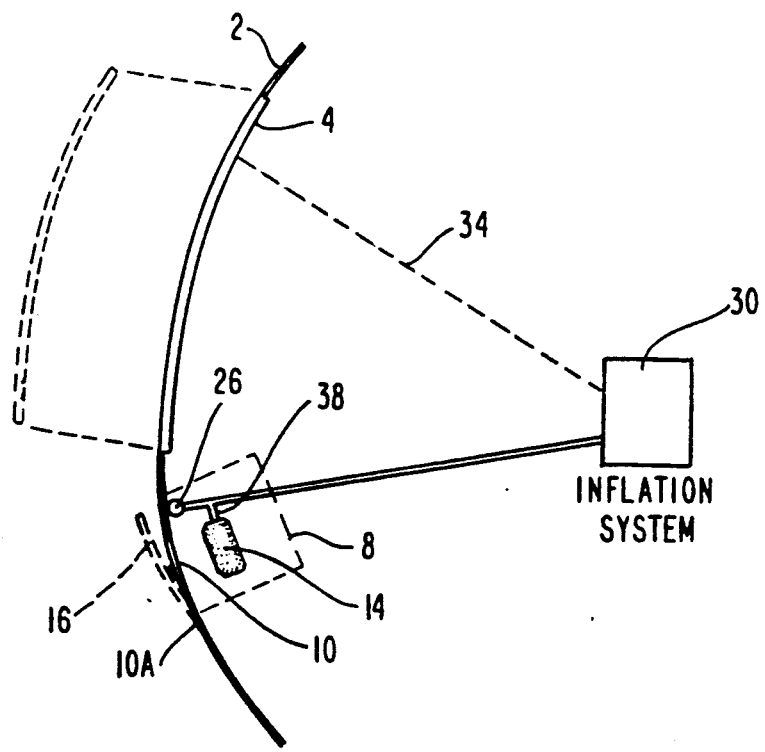
FIG. 5 is a schematic diagram generally illustrating the operation of the invention.

The operation of the invention is best understood with reference to FIG. 5. Thus, a remotely located inflation system is designated by the numeral 30. Inflation system 30 commonly includes a stored gas source, a high performance aspirator and an inflation valve/regulator assembly. The stored gas is supplied to the aspirator via a flexible double braided hose assembly or the like, and is discharged through a conduit 32. Aircraft door 4 is coupled to inflation system 30 through suitable mechanical means 34, such as a pulley and cable arrangement, as is well practiced in the art.

When aircraft door 4 is opened as shown in dotted lines in FIG. 5, mechanical means 34 is effective for actuating inflation system 30. When inflation system 30 is actuated, the stored gas therefrom is directed through conduit 32 to locks 26 which operate as heretofore described to release door 16 which pivots about lower edge 10A of frame 10 as described with reference to FIG. 1.

The stored gas which passes through conduit 32 to locks 26 is diverted through a conduit 38 which is connected to uninflated slide pack 14 to inflate the slide pack for deployment through open door 16. In this regard, it is understood that slide pack 14 is retained in pack form as by Velcro fasteners or the like which release upon the pack being inflated.

The arrangement is such that locks 26 are actuated by the stored gas so as to release door 16 just prior to the stored gas being received by slide pack 14 to inflate the pack. This is accomplished by disposing conduit 38 substantially normal to conduit 32 as shown in the Figure. Thus, when the inflation sequence for slide pack 14 starts, the sequence for opening door 16 has already been started by the actuation of locks 26 so that the inflated slide may be deployed from enclosure 8. A time delay via the relative placement of conduits 32 and 38 is thereby achieved, whereby the slide pack inflation sequence starts just after the door opening sequence.

The arrangement is such that in the event of a failure of pneumatic locks 26, the pressure against door 16 exerted by inflating slide pack 14 is sufficient to release the door, as is desireable.

Figure 4:
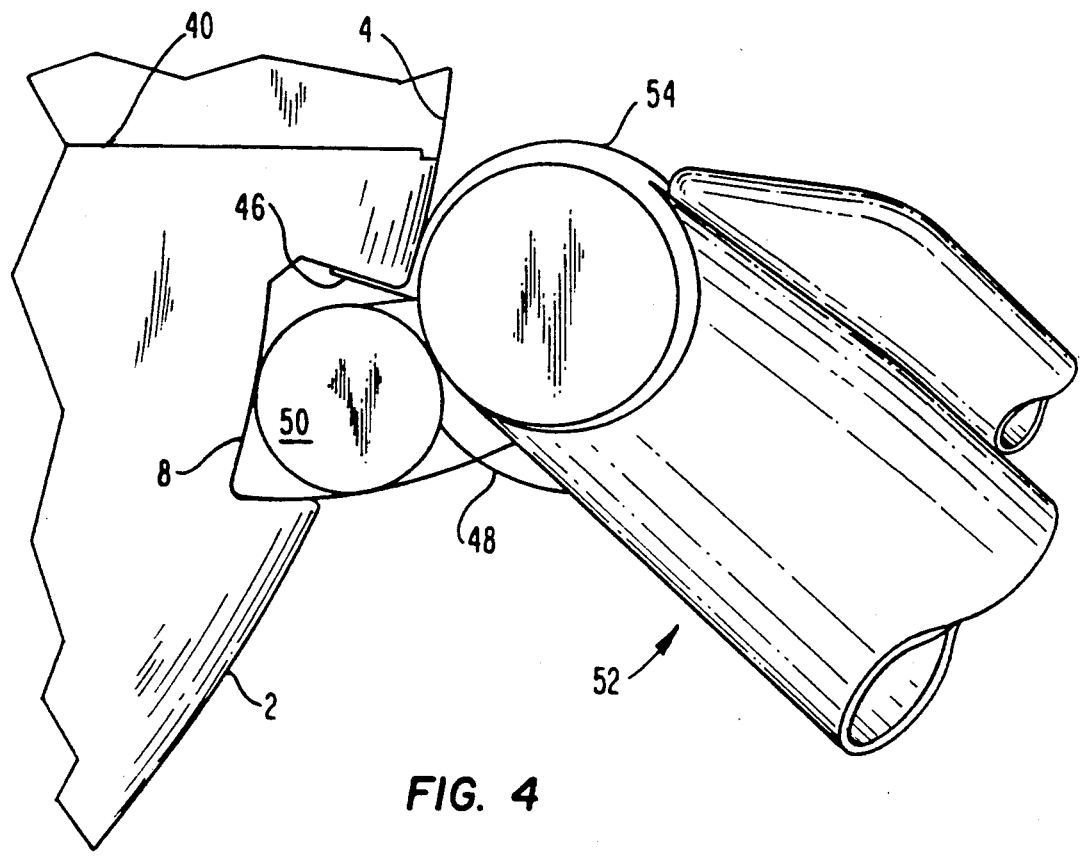
FIG. 4 is a diagrammatic representation showing means for rigidly and positively attaching an inflatable slide to the aircraft in accordance with the invention.

A particular advantage of the invention is to provide a more rigid and positive attachment of the inflated slide to the aircraft, and this feature of the invention is particularly illustrated in FIG. 4. Thus, and with reference to FIG. 4, enclosure 8 is disposed below aircraft exit door 4 and beneath the aircraft cabin floor 40. The more rigid and positive attachment of the inflated slide to the aircraft is achieved by the use of multiple girt attachments (structural attachments made from high strength fabric) shown as two in number and designated by the numerals 46 and 48, and an inflatable stabilizer tube 50 which is part of inflated slide 52 and which distends into enclosure 8 so as to key or lock inflated slide 52 to a slide sill tube 54 which is external enclosure 8 and near aircraft exit door 4, and which is also part of slide 52. Further, stabilizer tube 50 is captured and retained by the multiple girt attachments so that a positive interface is created as shown in the Figure.

In this regard, it will be understood that stabilizer tube 50 is securely attached to inflatable slide sill tube 54 for the full length of enclosure 8 to provide support and stability that does not depend on friction. Rather, the structure is keyed into the enclosure to prevent slide twisting, fore/aft movement, or other undesirable displacements from the intended usable attitude.

It will be understood that the arrangement shown in FIG. 4 is advantageous over the conventional method of attaching the inflatable slide to the aircraft via a single girt which attaches the slide to a bar at the aircraft door sill and relies on friction of the sill tube bearing against the aircraft skin for achieving the required stability. This conventional means does not have the positive keying effect provided by the stabilizer tube in the enclosure as herein described.

With the above description of the invention in mind, reference is made to the claims appended hereto for a definition of the scope of the invention.

What is claimed is:

1. An inflatable emergency evacuation slide arrangement for an aircraft, comprising:
    a non-pressurized cavity disposed below an exit door in the aircraft and beneath a floor in a passenger cabin of the aircraft so as to be outside of said cabin;
    an enclosure disposed within the cavity and including an opening and a frame surrounding the opening;
    a folded, inflatable slide pack disposed within the enclosure;
    a door for the enclosure which fits flush into the enclosure frame to close the opening, the door forming a part of the fuselage of the aircraft;
    means for retaining the enclosure door flush within the frame, and pneumatically operable for releasing the door from the frame;
    an inflation system including a stored gas source, said inflation system remotely disposed relative to the aircraft exit door and the folded, inflatable slide pack;
    the stored gas source coupled to the aircraft door and operable upon said aircraft door being opened for releasing the stored gas;
    conduit means connecting the stored gas source to the enclosure door retaining means and to the folded, inflatable slide pack, and directing the released stored gas first to the enclosure door retaining means to pneumatically operate said means for releasing the enclosure door from the frame to open said door, and then to the folded, inflatable slide pack for unfolding said pack and for providing an inflated slide which is deployed through the open enclosure door, said conduit means including a first conduit coupling the stored gas source to the enclosure door retaining means, a second conduit coupled to the first conduit and disposed substantially normal thereto, and coupled to the folded, inflatable slide pack, and said second conduit effecting a time delay by way of the disposition thereof relative to the first conduit, whereby the stored gas reaches the enclosure door retaining means for operating said means prior to said stored gas reaching the slide pack for unfolding said pack and for providing the inflated slide;
    an inflated stabilizer tube and an inflated slide sill tube, said tubes being part of the inflated slide, the slide sill tube being external the enclosure and the stabilizer tube being attached to the slide sill tube for the full length of said enclosure;
    the inflated stabilizer tube distending into the enclosure beneath the aircraft cabin floor so as to key the inflated slide to the slide sill tube; and
    a pair of girts coupled to the stabilizer tube, the slide sill tube and the slide for capturing and retaining the inflated stabilizer tube within the enclosure to inhibit undesirable displacement of the slide from a usable attitude.

2. An arrangement as described by claim 1, wherein:
    the means for retaining the enclosure door flush within the frame is disposed along the upper edge of the frame and engages the upper edge of the door;
    the lower edge of the enclosure door includes a projection extending therealong;
    the corresponding lower edge of the frame includes a lip extending therealong;
    the projection fits behind the lip along the entire length of the lower edge of the door, whereby the door is pivotable about the lower frame edge away from the frame when the door is opened; and
    upon the door pivoting a predetermined angle the door separates from the frame and is carried away from the inflated slide via a tethering line so as not to adversely affect the function of the inflated slide.

3. An arrangement as described by claim 2, including:
    a seal disposed in a channel in the lower edge of the frame just inboard of the lower door edge;
    seals disposed in channels in the upper and side edges of the frame; and
    the door closing and sealing against a flange on the upper and side edges of the frame, whereby a radial force system is created to provide sealing forces.

4. An arrangement as described by claim 1, wherein:
    the means for retaining the enclosure door flush within the frame is accessible from the outside of the aircraft for manual operation of the retaining means for releasing the door from the frame.

5. An arrangement as described by claim 1, wherein:

the means for retaining the enclosure door flush within the frame is arranged so that the pressure against the door exerted upon the slide pack being unfolded and the inflated slide being provided is sufficient for releasing the door from the frame.

6. An inflatable emergency slide evacuation arrangement for an aircraft comprising:

a non-pressurized cavity disposed below an exit door in the aircraft and beneath a floor in a passenger cabin of the aircraft so as to be outside of said cabin;

an enclosure disposed within the cavity and including an opening and a door for closing the opening to close the enclosure;

an inflatable slide disposed within the closed enclosure;

means for opening the door to open the enclosure;

means for inflating the slide, with the inflated slide being thereupon deployed out of the open enclosure;

the inflated slide arranged with the open enclosure to inhibit undesirable displacement of the slide from a usable attitude;

the inflated slide including a stabilizer tube and a slide sill tube, the slide sill tube being external the enclosure and the stabilizer tube being attached to the slide sill tube for the full length of the enclosure;

the stabilizer tube distending into the enclosure beneath the aircraft cabin floor so as to key the slide to the slide sill tube;

girt means including multiple girt attachments coupled to the stabilizer tube, the slide sill tube and the slide for capturing and retaining the stabilizer tube within the enclosure to inhibit said undesirable displacement of the slide from a usable attitude;

the means for opening the door to open the enclosure being pneumatically operable;

a stored gas source coupled to the inflatable slide and to the means for opening the door;

means for actuating the stored gas source to release the stored gas; and the inflatable slide and the door opening means being responsive to the released stored gas so that the door is opened just prior to that start of an inflating sequence for the inflatable slide.

* * * * *